US007690984B2

(12) United States Patent
Tran et al.

(10) Patent No.: US 7,690,984 B2
(45) Date of Patent: Apr. 6, 2010

(54) FEATURE GAME WITH RANDOM POPULATION FEATURE

(75) Inventors: Toan Tran, Botany (AU); Ichiro Tsuchida, Chatswood (AU)

(73) Assignee: Konami Australia Pty Ltd., Botany, NSW (AU)

(*) Notice: Subject to any disclaimer, the term of this patent is extended or adjusted under 35 U.S.C. 154(b) by 183 days.

(21) Appl. No.: 11/281,258

(22) Filed: Nov. 17, 2005

(65) Prior Publication Data

US 2006/0183533 A1 Aug. 17, 2006

Related U.S. Application Data

(60) Provisional application No. 60/661,798, filed on Mar. 14, 2005.

(30) Foreign Application Priority Data

Feb. 14, 2005 (AU) .............................. 2005900679

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/20; 463/16

(58) Field of Classification Search .................... 463/20
See application file for complete search history.

(56) References Cited

U.S. PATENT DOCUMENTS 4,448,419 A 5/1984 Telnaes
5,152,529 A 10/1992 Okada
5,395,111 A 3/1995 Inoue
5,609,524 A 3/1997 Inoue (Continued)

FOREIGN PATENT DOCUMENTS

AU 768153 1/2002

(Continued)

OTHER PUBLICATIONS

International Search Report on Patentability for PCT Application No. PCT/AU2004/001767.

(Continued)

*Primary Examiner*—John M Hotaling
*Assistant Examiner*—Kevin Y Kim
(74) *Attorney, Agent, or Firm*—Knobbe, Martens, Olson & Bear, LLP

(57) ABSTRACT

A gaming machine arranged to display a symbol in each element of a matrix of elements; each column of elements of said matrix of elements comprising a portion of a simulated rotatable reel and wherein at an occurrence of a trigger event at end of play of a main game;

(a) said main game is completed and any prize is awarded, (b) at least one feature game may be awarded wherein each said rotatable reel is caused to be spun and brought to rest to display elements of said matrix in a first stage; said first stage displaying symbols in elements of at least one said column and uniform imagery in elements of each remaining said column; said feature game then progressing to a further stage wherein elements with said uniform imagery are populated by symbols of said elements of said at least one column.

21 Claims, 8 Drawing Sheets

U.S. PATENT DOCUMENTS

| | | | | |
|---|---|---|---|---|
| 5,611,535 | A | | 3/1997 | Tiberio |
| 5,722,891 | A | | 3/1998 | Inoue |
| 5,752,881 | A | | 5/1998 | Inoue |
| 5,807,172 | A | | 9/1998 | Piechowiak |
| 5,976,016 | A | * | 11/1999 | Moody et al. .................. 463/13 |
| 5,984,781 | A | | 11/1999 | Sunaga |
| 6,159,096 | A | | 12/2000 | Yoseloff |
| 6,241,607 | B1 | | 6/2001 | Payne et al. |
| 6,309,299 | B1 | | 10/2001 | Weiss |
| 6,319,124 | B1 | * | 11/2001 | Baerlocher et al. ............ 463/20 |
| 6,394,902 | B1 | | 5/2002 | Glavich et al. |
| 6,439,993 | B1 | | 8/2002 | O'Halloran |
| 6,464,581 | B1 | | 10/2002 | Yoseloff et al. |
| 6,517,433 | B2 | | 2/2003 | Loose et al. |
| 6,604,999 | B2 | | 8/2003 | Ainsworth |
| 6,644,664 | B2 | * | 11/2003 | Muir et al. .................. 273/146 |
| 6,663,487 | B1 | | 12/2003 | Ladner |
| 6,726,204 | B2 | | 4/2004 | Inoue |
| 6,805,349 | B2 | * | 10/2004 | Baerlocher et al. ....... 273/138.2 |
| 6,869,357 | B2 | | 3/2005 | Adams et al. |
| 6,880,826 | B2 | | 4/2005 | Inoue |
| 6,893,018 | B2 | | 5/2005 | Inoue |
| 6,896,615 | B2 | | 5/2005 | Berman |
| 6,905,408 | B2 | | 6/2005 | Inoue |
| 6,908,381 | B2 | | 6/2005 | Ellis |
| 6,910,962 | B2 | * | 6/2005 | Marks et al. .................. 463/16 |
| 6,932,700 | B2 | | 8/2005 | Bennett et al. |
| 6,960,134 | B2 | | 11/2005 | Hartl et al. |
| 7,056,213 | B2 | * | 6/2006 | Ching et al. .................. 463/20 |
| 7,214,132 | B2 | | 5/2007 | Inoue |
| 7,311,602 | B2 | | 12/2007 | Inoue |
| 7,316,395 | B1 | | 1/2008 | Kromydas |
| 2002/0039920 | A1 | | 4/2002 | Bryant |
| 2002/0123378 | A1 | | 9/2002 | Bucknall et al. |
| 2003/0013517 | A1 | | 1/2003 | Bennett et al. |
| 2004/0012145 | A1 | | 1/2004 | Inoue |
| 2004/0014516 | A1 | | 1/2004 | Inoue |
| 2004/0014517 | A1 | | 1/2004 | Inoue |
| 2004/0017041 | A1 | | 1/2004 | Inoue |
| 2004/0026854 | A1 | | 2/2004 | Inoue |
| 2004/0036218 | A1 | | 2/2004 | Inoue |
| 2004/0038726 | A1 | | 2/2004 | Inoue |
| 2004/0048646 | A1 | | 3/2004 | Visocnik |
| 2004/0053679 | A1 | * | 3/2004 | Getz et al. .................... 463/20 |
| 2004/0058727 | A1 | | 3/2004 | Marks et al. |
| 2004/0116175 | A1 | | 6/2004 | Aida |
| 2004/0198486 | A1 | * | 10/2004 | Walker et al. ................. 463/20 |
| 2004/0266520 | A1 | | 12/2004 | Aida |
| 2005/0043083 | A1 | | 2/2005 | Inoue |
| 2005/0043084 | A1 | | 2/2005 | Inoue |
| 2005/0277460 | A1 | | 12/2005 | Inoue |
| 2006/0046830 | A1 | | 3/2006 | Webb |
| 2006/0052155 | A1 | | 3/2006 | Inoue |
| 2006/0084492 | A1 | | 4/2006 | Baerlocker et al. |
| 2006/0084498 | A1 | | 4/2006 | Baerlocker et al. |
| 2006/0166731 | A1 | | 7/2006 | Yoshimi et al. |
| 2006/0183534 | A1 | | 8/2006 | Yoshimi |
| 2006/0247002 | A1 | | 11/2006 | Yoshimi et al. |
| 2006/0287060 | A1 | | 12/2006 | Yoshimi |
| 2007/0015565 | A1 | | 1/2007 | Chan |
| 2007/0270203 | A1 | | 11/2007 | Aida |
| 2008/0045300 | A1 | | 2/2008 | Quayle et al. |
| 2008/0045323 | A1 | | 2/2008 | Berman |

FOREIGN PATENT DOCUMENTS

| | | |
|---|---|---|
| AU | 2002301067 | 6/2003 |
| AU | 2004203045 | 7/2004 |
| JP | 2002-325881 | 11/2002 |
| JP | 2003-236055 | 8/2003 |

OTHER PUBLICATIONS

Office Action of Jan. 28, 2008 for U.S. Appl. No. 11/413,707.

* cited by examiner

FEATURE GAME WITH RANDOM POPULATION FEATURE

RELATED APPLICATIONS

This application claims the benefit of U.S. Provisional Patent Application No. 60/661,798, filed Mar. 14, 2005 and Australian Provisional Patent Application No. 2005900679, filed Feb. 14, 2005 which are hereby incorporated by reference in their entirety herein.

BACKGROUND

The present invention relates to gaming machines for the playing of games of chance and, more particularly, to special features of bonus or feature games which may be offered on such machines.

Gaming, or poker machines, have become a major source of amusement and diversion in such places as clubs, hotels and casinos in many parts of the world.

Traditionally such machines were mechanical devices where a number of reels marked with a plurality of numbers or symbols could be made to spin randomly by the application of some mechanical input. If the subsequent patterns of numbers or symbols displayed on the reels, when these returned to a rest state, corresponded to predetermined patterns, the machine would provide a prize or payout. Generally such gaming machines have come to be regulated by government authorities as to their number and in the manner in which the machines must return a percentage of the monetary turnover to the players.

The introduction of electronics, computers and electronic graphical displays, has allowed a continual increase in the complexity and variations of gaming machines, games and displays while maintaining the basic concept of the traditional machine.

Machines and games that offer novel and stimulating variations on the basic game theme and environment are eagerly sought by the gaming industry and there is consequently intense competition between machine manufacturers to innovate.

Nevertheless the repetitive playing of even modern gaming machines can lead to boredom of the players with a consequent under-utilization of machines and increase in player dissatisfaction.

It is an object of the present invention to address or at least ameliorate some of the above disadvantages.

BRIEF DESCRIPTION OF INVENTION

Accordingly, in a first broad form of the invention, there is provided a gaming machine arranged to display a symbol in each element of a matrix of elements; each column of elements of said matrix of elements comprising a portion of a simulated rotatable reel and wherein at an occurrence of a trigger event at end of play of a main game;

(a) said main game is completed and any prize is awarded, (b) at least one feature game may be awarded wherein each said rotatable reel is caused to be spun and brought to rest to display elements of said matrix in a first stage; said first stage displaying symbols in elements of at least one said column and uniform imagery in elements of each remaining said column; said feature game then progressing to a further stage wherein elements with said uniform imagery are populated by symbols of said elements of said at least one column.

Preferably, symbols in elements of said simulated rotatable reel of said at least one column in said first stage of said feature game are a subset of symbols of said simulated rotatable reel of said main game.

Preferably, any wild or scatter symbols displayed at an end of a main game are retained for said first stage of said feature game.

Preferably, a prize is awarded based on a winning combination of said wild or scatter symbols retained for said first stage of said feature game.

Preferably, symbols of said elements of said at least one column used to populate elements of said each remaining column does not include any said wild or scatter symbols.

Preferably, criteria for awarding of a prize in said feature game are identical to criteria for awarding of a prize in said main game.

Preferably, criteria for awarding of a prize in said feature game are different to criteria for awarding of a prize in said main game.

Preferably, said at least one column is a left-most column of said matrix of elements.

Preferably, said uniform imagery is a depiction of field of snow.

Preferably, said elements are N-sided elements; where N is a variable and values of N include N=1.

Preferably, said values of N include 4, 5, 6, 7, 8, 9, 10, 11, 12, 13, 14, 15, 16, 17, 18, 19 and 20.

Preferably, said N-sided elements are regular hexagons.

In a further broad form of the invention, there is provided a method for shortening odds of a winning outcome of a feature game of chance played on a gaming machine; said gaming machine provided with a display unit in which portions of a number of simulated rotatable reels of symbol containing elements are displayed as a matrix of symbol containing elements; said method including at conclusion of a main game the steps of:

(a) reconfiguring at least one of said simulated rotatable reels to comprise a subset of symbols in said symbol containing elements, (b) reconfiguring a selection of said symbol containing elements of remaining ones of said simulated rotatable reels to display uniform imagery, (c) spinning and returning to a rest position said simulated rotatable reels, (d) populating said elements displaying said uniform imagery with selected symbols displayed in said column of said matrix corresponding to said at least one said simulated rotatable reel.

Preferably, said selection of said symbol containing elements includes all said symbol containing elements of said remaining ones of said rotatable reels.

Preferably, said selection of said symbol containing elements excludes at least one element of one element of at least one said remaining ones of said simulated rotatable reels.

Preferably, said at least one element is caused to display a “scatter” symbol.

Preferably, said at least one element is caused to display a “wild” symbol.

Preferably, “scatter” or “wild” symbols displayed in columns corresponding to said remaining ones of said simulated rotatable reels in a preceding main game are retained in position in said matrix for a first stage of said feature game.

Preferably, said selected symbols displayed in said column of said matrix corresponding to said at least one said simulated rotatable reel includes all of said symbols displayed in said column.

Preferably, said selected symbols displayed in said column of said matrix corresponding to said at least one said simulated rotatable reel excludes a "scatter" symbol.

Preferably, said selected symbols displayed in said column of said matrix corresponding to said at least one said simulated rotatable reel excludes a "wild" symbol.

In yet a further broad form of the invention, there is provided a method of implementing a game of any one of claims 1 to 21 on a gaming machine; said method including the steps of:

(e) providing said gaming machine with a control module; said module including a microprocessor, a working memory and a data storage device connection means, (f) writing program code to said data storage device, (g) connecting said data storage device to said control module.

In still a further broad form of the invention, there is provided media for storing enabling digital code for playing games according to any of claims 1 to 21; said media comprising solid state data retaining devices including, read only memory (ROM) and erasable programmable read only memory (EPROM), compact flash cards and PCMCIA cards; said media further including disc-based storage devices.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
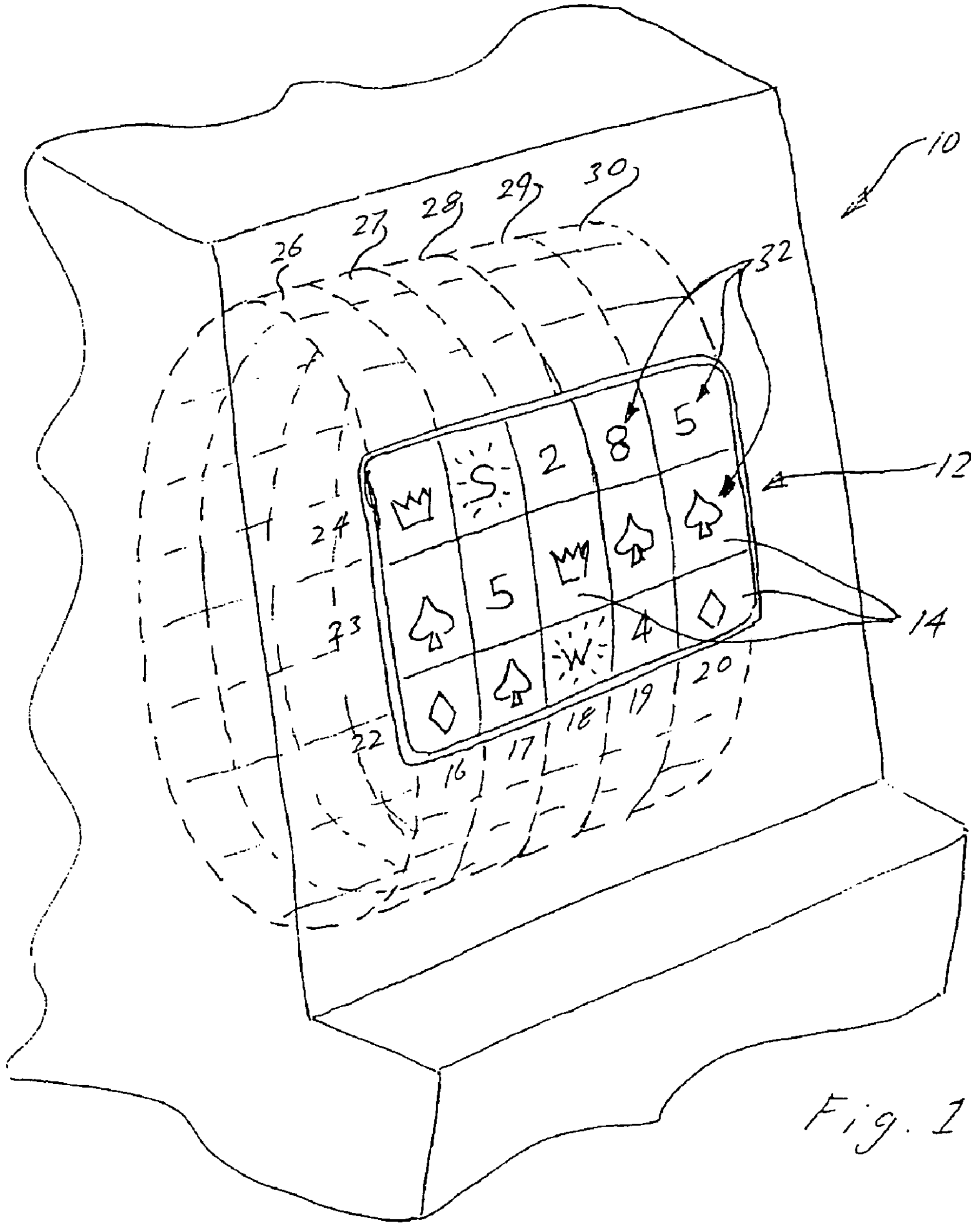
FIG. 1 is a partial view of a gaming machine and a display showing a matrix of elements as portions of simulated rotatable reels.
Figure 2:
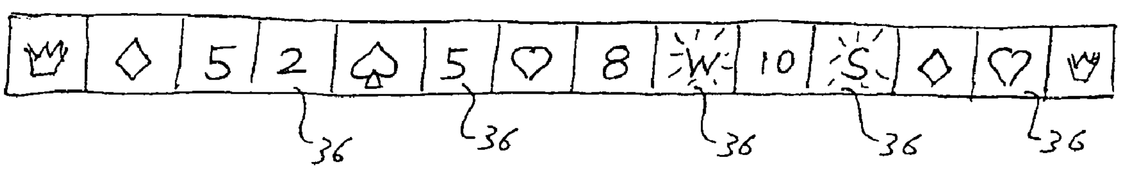
FIG. 2 is a representation of one of the simulated rotatable reels of FIG. 1 shown in strip form.

With reference to FIG. 1 a gaming machine 10 has a display 12 which is, in this example, comprised of a five column and three row matrix of elements 14. The columns 16 to 20 each displaying three elements of rows 22, 23 and 24, are those portions visible in the display 12 of digitally simulated reels 26 to 30. Each simulated reel is divided into a predetermined number of elements, to each of which is allocated a symbol 32. Thus, as illustrated in FIG. 2, each reel may be considered as formed of a strip 34 divided into segments 36 with a particular symbol in each segment so as to form a sequence of symbols. During play of a main game on the gaming machine 10, the simulated reels are spun and randomly brought to rest to display the matrix of elements and their corresponding symbols as shown in FIG. 1.

Typically, a predetermined disposition of symbols within the matrix of elements will determine if the player of the main game has won a prize. If so, the process of payment or normal conferment of the prize is completed. Additionally, in the present invention, a further specific disposition of, or appearance of, selected symbols may confer one or more feature games to the player of the main game. A particular aspect of the feature game is a shortening of the odds of winning a prize, as compared to those odds of the main game.

First Preferred Embodiment of the Feature Game

The feature game in a first preferred embodiment of the invention, also involves the display of the same matrix of elements as for the main game but now each of the simulated reels is modified at various stages of the feature game. Firstly, one reel, preferably the left-most reel 26, is reconfigured by the game controller. Although retaining the same number of segments, the new selection of symbols now assigned to this reel is a subset of the symbols of that reel as used in the main game. Thus for example, the main game may have utilised all the cards of a particular suite, whereas the subset may be restricted to just a selection of the cards.

Figure 3:
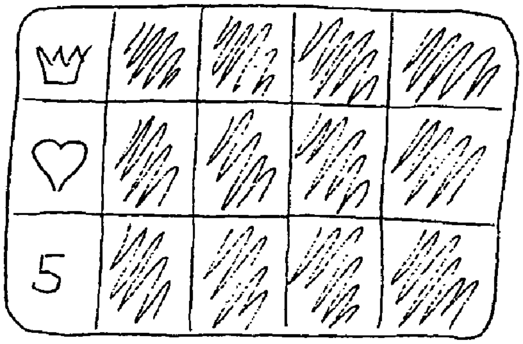
FIGS. 3 and 4 show two stages of a first preferred embodiment of a game playable on the gaming machine of FIG. 1, FIGS. 5 and 6 show two stages of a second preferred embodiment of a game playable on the gaming machine of FIG. 1, FIGS. 7 to 9 show stages of a third preferred embodiment of a game playable on the gaming machine of FIG. 1

As shown in FIG. 3, the elements of the remaining four reels are transformed to show, in place of the original symbols, the same uniform imagery except that in at least one of these reels at least one element is provided with a "scatter" or a "wild" symbol. The uniform imagery may represent some textured surface or terrain, such as for example a field of snow.

All the reels are now spun and brought to rest to display three elements and their corresponding symbols in the left-most column. All elements of the four remaining columns two, three, four and five, may display only the uniform imagery or, may in addition display in one or more columns, a "scatter" or "wild" symbol.

Where, according to the rules of the feature game, a prize is won if the display shows one of a selection of pre-determined numbers and arrangements of "scatter" or "wild" symbols, and the display shows one such predetermined number and arrangement of symbols, the prize is awarded prior to the game proceeding to the next stage.

Figure 4:
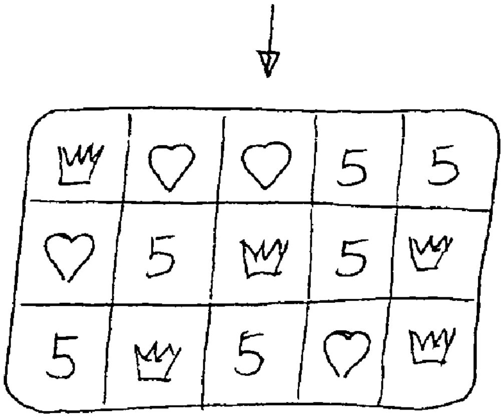

Any scatter symbols displayed in any elements of columns two, three, four and five now disappear; these element changing to the uniform imagery as previously described, so that at this stage all four columns display only the uniform imagery. The symbols which have remained displayed in the left-most column, are then used to gradually, and at random, populate the elements of the elements of the other columns as shown in FIG. 4.

It will be apparent that each element of the matrix then displays one of only three possible symbols. Thus, if a paying or prize winning outcome is defined for example as two identical or related symbols appearing side by side in the central row of the matrix or along some other indicated pay line, the odds of such an occurrence are greatly increased. The offering therefore of one or more feature games as a result of some triggering combination in the main game will be eagerly anticipated by players of the main game.

Second Preferred Embodiment of the Feature Game

Figure 5:
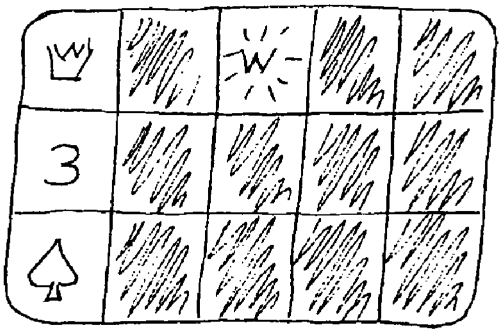

In this preferred embodiment of the feature game, some particular symbols displayed as an outcome of the main game which triggered the offering of one or more feature games, are retained. Thus a main game in which some of the symbols of the elements are "wild" or "scatter" symbols, if displayed at the conclusion of the main game, will be retained in their positions in the four right hand columns of the matrix, as shown in FIG. 5.

AS in the first preferred embodiment described above, at the commencement of the feature game, the left-most reel is reconfigured with a reduced symbol set while those elements of the other four columns of the display not showing a "wild" or "scatter" symbol, are transformed into uniform imagery. Again all the reels are spun but with the "wild" or "scatter" symbols remaining fixed in their positions.

Figure 6:
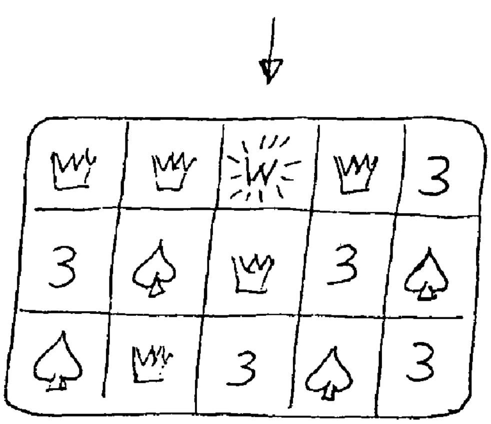

As before, and as shown in FIG. 6, when the reels come to rest, those elements of the four columns now displaying the uniform imagery are populated randomly by the symbols displayed in the left most column. In the case where one or more "scatter" or "wild" symbols have been retained from the main game, the odds of a winning combination are therefore yet further increased.

Third Preferred Embodiment of the Feature Game

Figure 7:
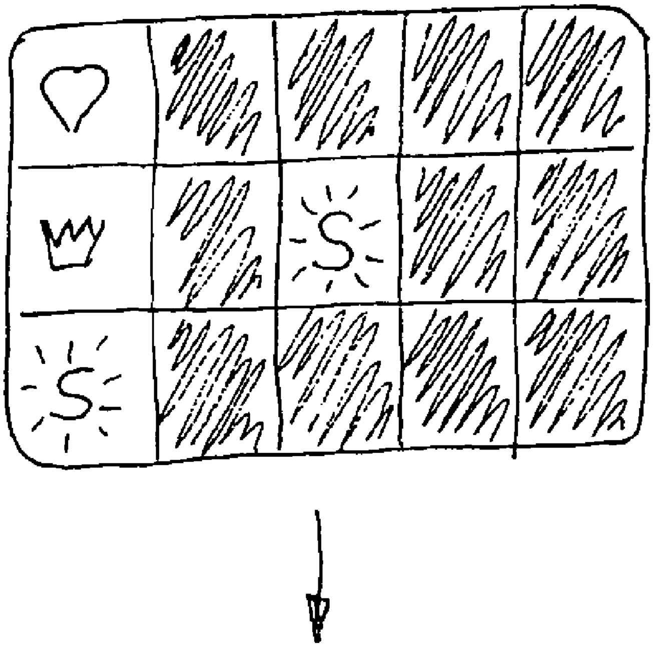

In this preferred embodiment, as may be seen in FIG. 7, if a "wild" or "scatter" symbol appears in an element of the left-most column, it is retained at the end of the main game, as well as any "wild" or "scatter" symbol displayed in elements of the other four reels. The left-most reel is again reconfigured with a reduced symbol set and spun, but the "wild" or "scatter" symbol overrides whatever symbol may otherwise have appeared in that element when the reel comes to rest. As in the previous embodiments described above, the remaining elements of the other four columns assume the uniform imagery.

Figure 8:
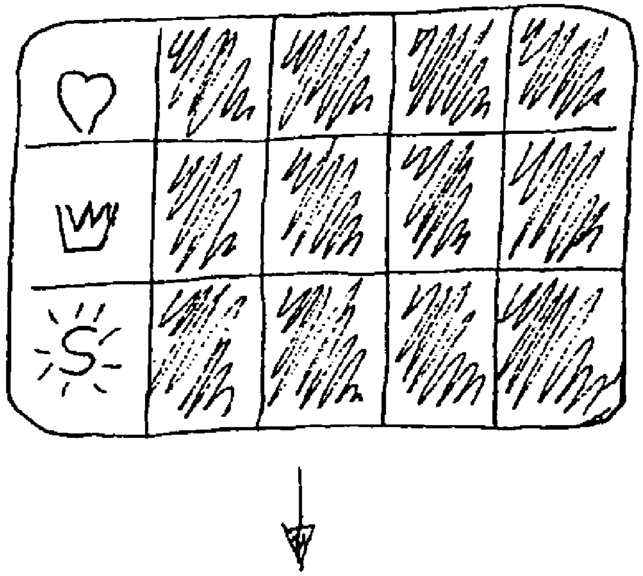
Figure 9:
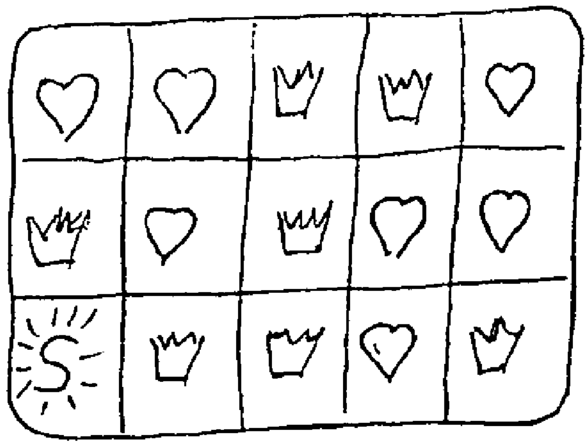

If a "wild" or "scatter" symbol in the left-most column can be combined with a "wild" or "scatter" symbol retained in any of the other four columns to qualify for a prize, that prize is awarded and that element then also is transformed to display the uniform imagery. The elements of the other four columns are then populated at random with the two remaining symbols displayed in the left-most column. The sequence is shown in FIGS. 7 to 9.

Fourth Preferred Embodiment

Figure 10:
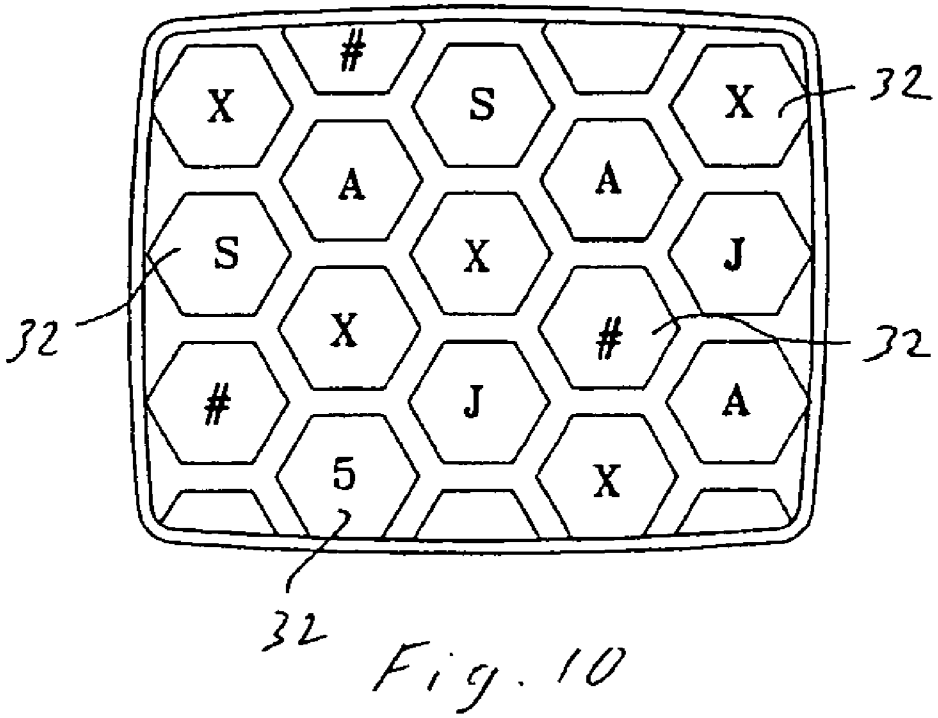
FIGS. 10 and 11 show examples of the display of FIG. 1 during play of a game using hexagonal elements.
Figure 11:
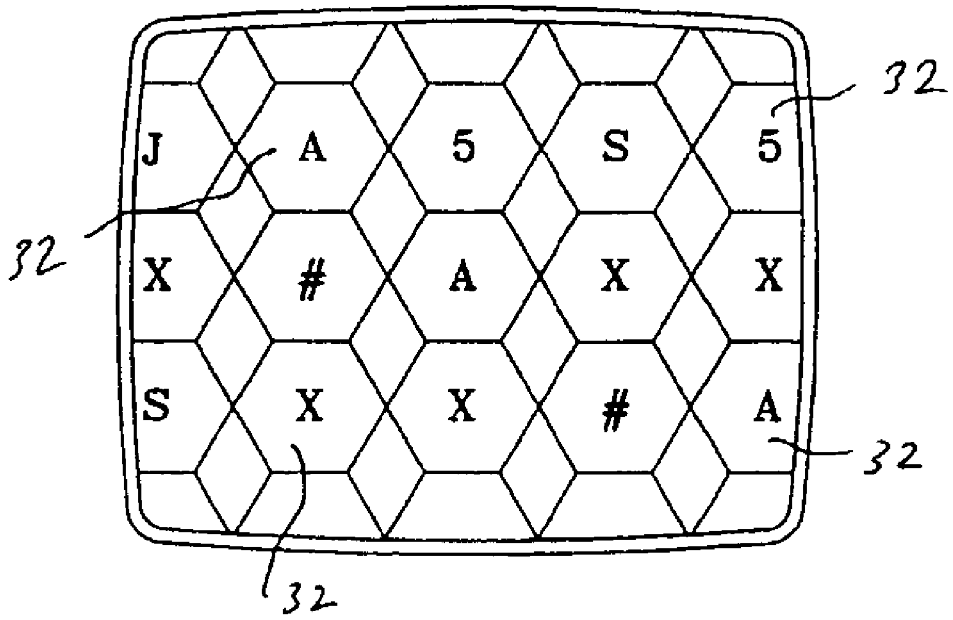

The elements comprising the matrix of elements of the above described embodiments may be of conventional rectangular configuration, but in at least one preferred embodiment the delineation of an element, that is, the boundary defining the field containing a symbol, may be any N-sided figure, where N may take the value 1 (thus a circular field) or any value from 3 to 20. In at least one preferred form of N-sided element, as shown in FIGS. 10 and 11, the elements 32 are hexagon shape for the value of N=6.

Game Implementation

Figure 12:
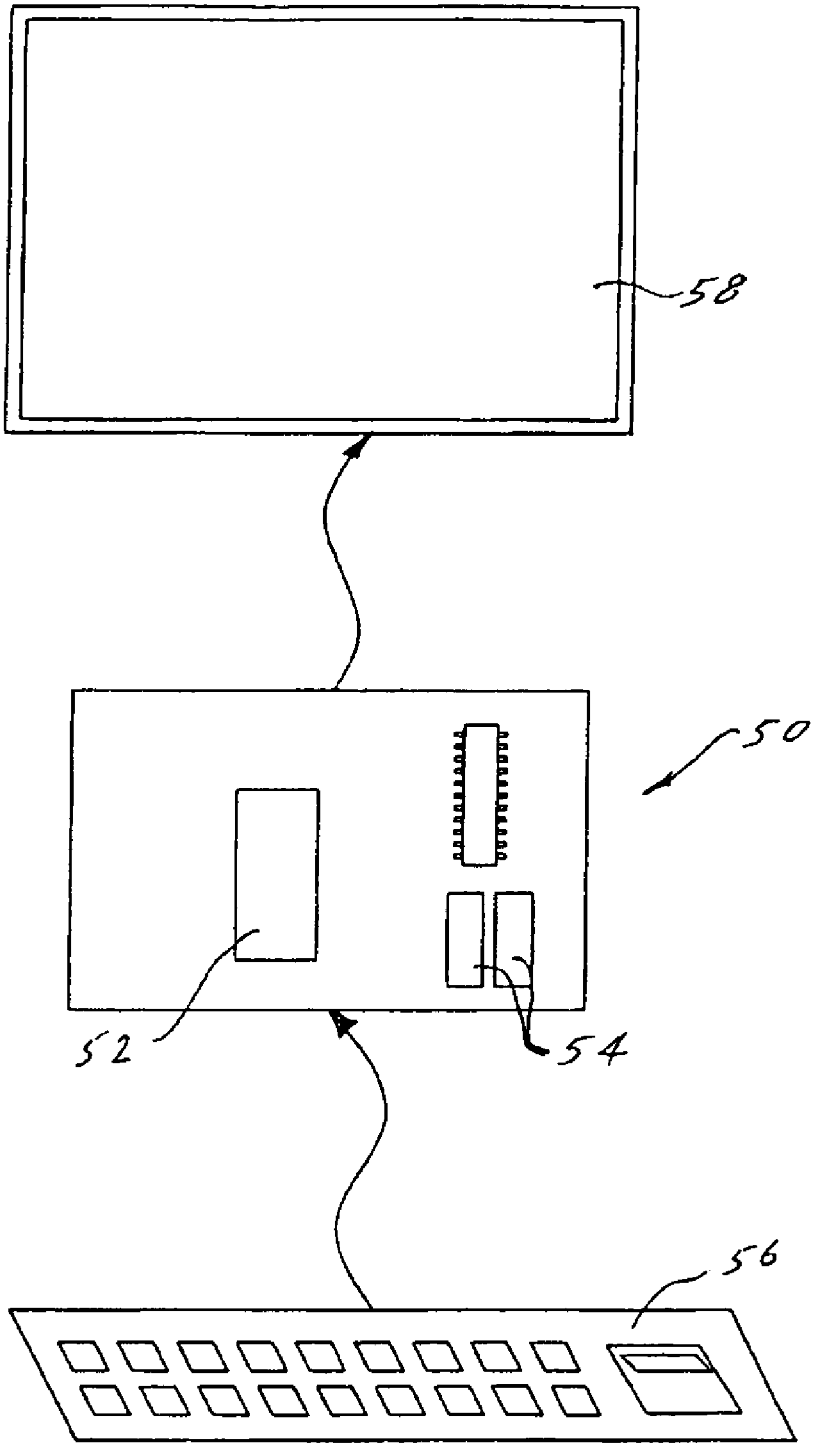
FIG. 12 is a schematic representation of a control module, input keyboard and display for implementing the game embodiments of FIGS. 3 to 9.

Any of the above described embodiments may be implemented on any gaming machine or group of gaming machine provided with a control module. As shown in FIG. 12, a control module 50 is provided with a microprocessor 52 and working random access memory (RAM) 54. The program code driving any of the described embodiments may be introduced into the control module 50 by connection of a data storage device. The device may take any of a number of forms, such as read only memory (ROM), erasable read only memory (EPROM), Compact Flash Card, PCMCIA card and the like. Alternatively, control module 50 may incorporate a hard disc drive to which the code may be written via a suitable input device.

Control module 50 acts to implement appropriate elements of the program code according to inputs from a user keyboard 56 and outputs video imagery to at least a main display module 58.

Examples of Gaming Machine Implementation

1. Stand-Alone Gaming Machines

Figure 13:
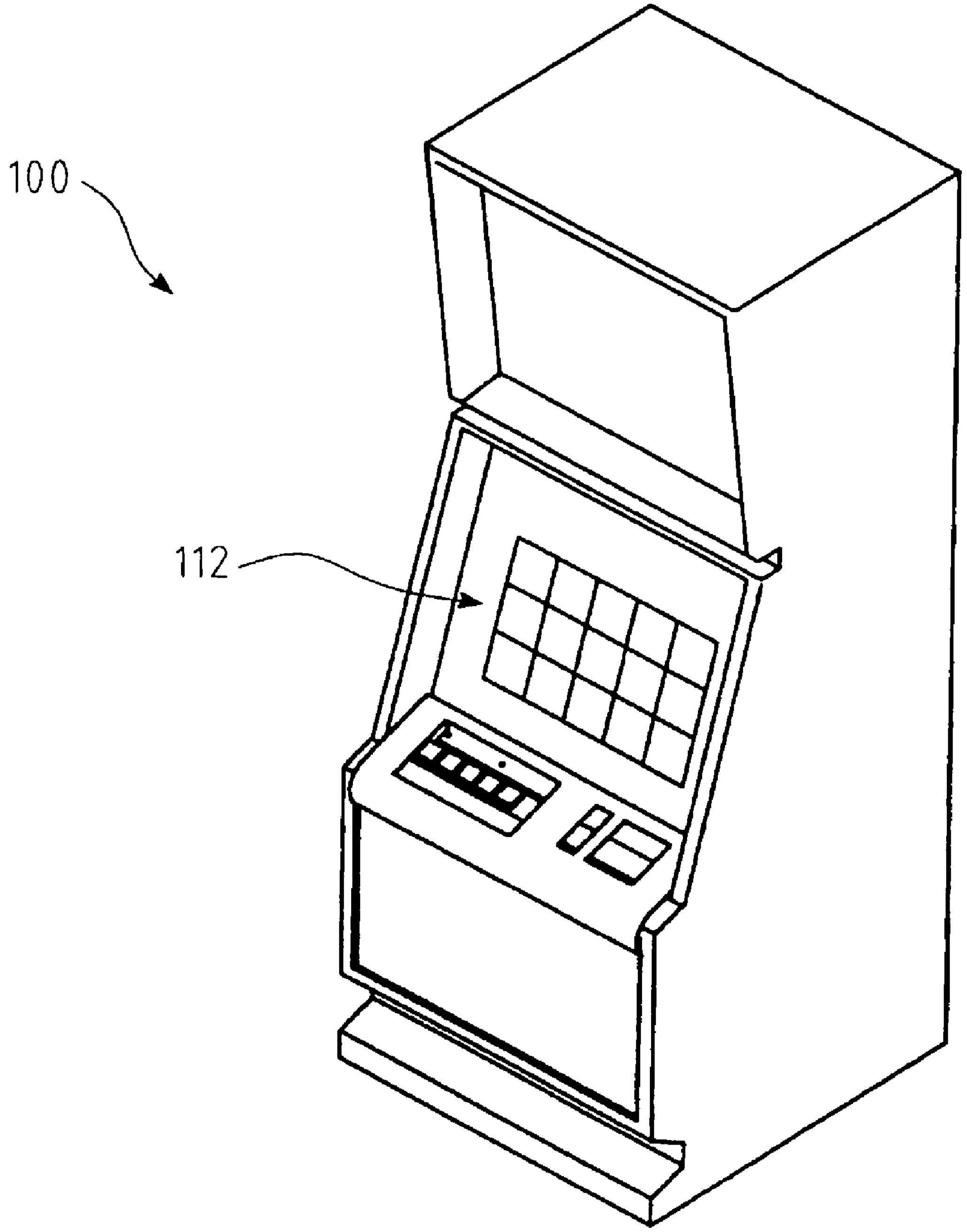
FIG. 13 is a perspective view of a stand-alone gaming machine with a single display unit.

As shown in FIG. 13, any of the above described embodiments for use on electronic display gaming machines may be incorporated into a stand-alone gaming machine 100 provided with a single display unit 112. In this implementation of games according to the invention, both main games and feature games are displayed on the single display unit.

2. Stand-Alone Gaming Machines with Secondary Display Unit

Figure 14:
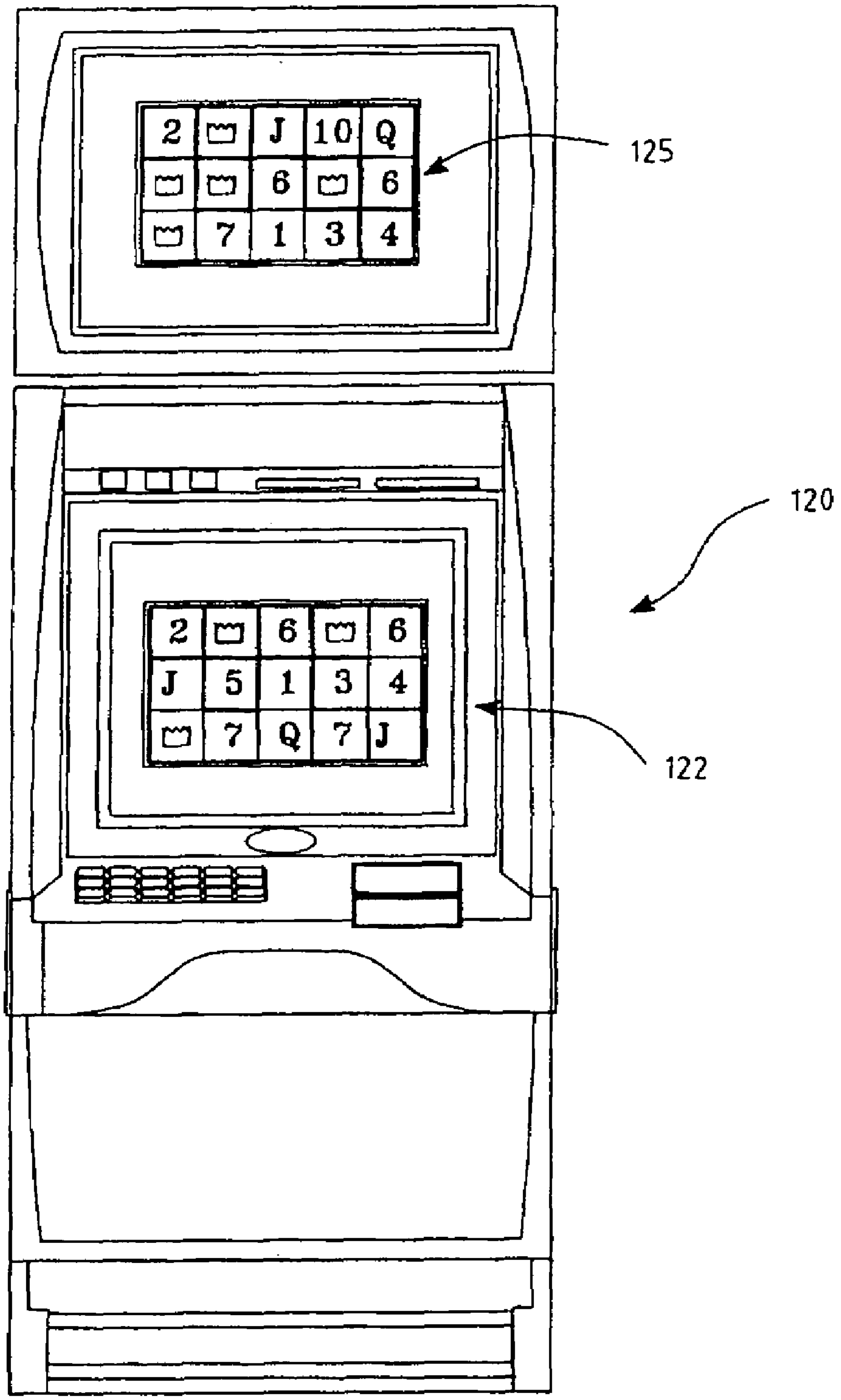
FIG. 14 is a front view of a stand-alone gaming machine with a main display and a secondary display unit.
Figure 15:
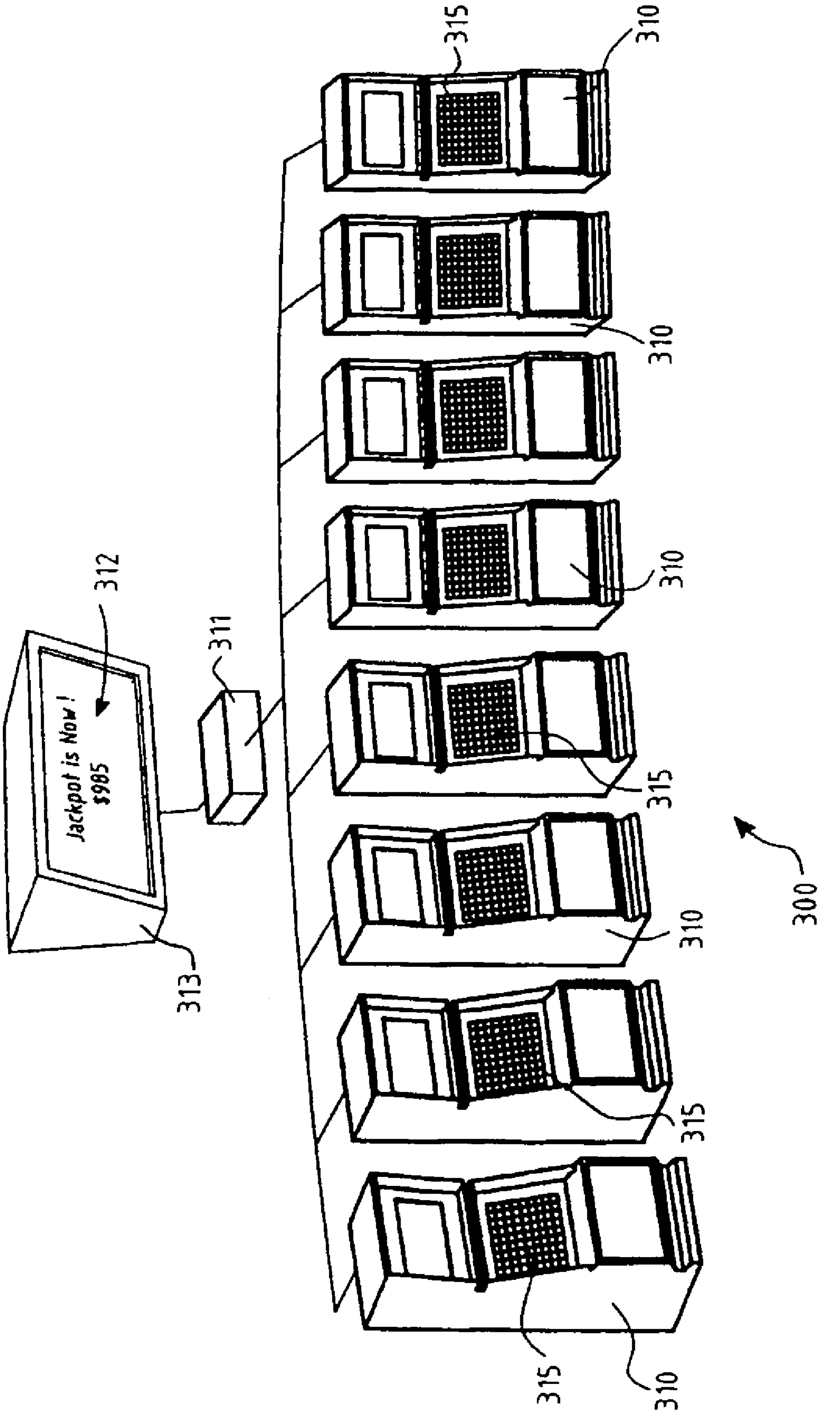
FIG. 15 is a perspective view of a number of the gaming machines of FIG. 13 or 14 when linked to a progressive jackpot system.

In a further preferred embodiment of the invention as shown in FIG. 14, a stand-alone gaming machine 120 is provided with a secondary display unit 125 as well as a main display unit 122. In this embodiment the feature game played on the secondary display unit may take the form of either the first, second or third preferred embodiments described above. It is then a triggering event in the main game which offers a player a feature game as described in the preferred embodiments above.

3. Gaming Machines Linked to Progressive Jackpot System

In yet a further preferred embodiment of the invention as shown in FIG. 14, a plurality of gaming machines 300 are arranged side by side in a line or arc so as to allow each of the players (not shown) of the machines to view a common jackpot prize display unit 313. Each individual machine 310 is provided with at least a main game display unit 315 for the playing of a main game according to the above described embodiments Each of machines 310 of the embodiment illustrated in FIG. 12 is electronically linked to a jackpot control module 311 which monitors the volume of play on each of the linked machines and displays an incrementing jackpot value 312 determined according to the combined volume of play on the linked machines.

A win of the jackpot prize may be triggered by specific outcomes of either a main game or of a feature game. If the jackpot trigger is dependent on an outcome of the feature game, players on adjoining machines may be made aware by means of the common display that a potential triggering of the jackpot is to commence on the machine offered the feature game, thus adding interest for all the players.

It will be appreciated that the linked machines may form part of Local Area Networks (LAN) or Wide Area Networks (WAN).

The above describes only some embodiments of the present invention and modifications, obvious to those skilled in the art, can be made thereto without departing from the scope and spirit of the present invention.

What is claimed is:

1. A gaming machine arranged to display a symbol in each element of a matrix of elements; each column of elements of said matrix of elements comprising a portion of a simulated rotatable reel and wherein at an occurrence of a trigger event at the end of play of a main game;

(a) said main game is completed and any prize is awarded, (b) at least one feature game may be awarded wherein:

at least one said simulated rotatable reel is configured with elements comprising a subset of elements of said main game;

each said rotatable reel is spun and brought to rest to display elements of said matrix in a first stage; said first stage displaying symbols from said subset of elements in elements of at least one said column corresponding to said at least one rotatable reel and uniform imagery in elements of each remaining said column; said feature game then progressing to a further stage wherein all symbols of said elements of said at least one column are used to randomly populate elements displaying said uniform imagery.

2. The gaming machine of claim 1 wherein symbols in elements of said simulated rotatable reel of said at least one column in said first stage of said feature game are a subset of symbols of said simulated rotatable reel of said main game.

3. The gaming machine of claim 1 wherein any wild or scatter symbols displayed at an end of said main game are retained for said first stage of said feature game.

4. The gaming machine of claim 3 wherein a prize is awarded based on a winning combination of said wild or scatter symbols retained for said first stage of said feature game.

5. The gaming machine of claim 3 wherein symbols of said elements of said at least one column used to populate elements of said each remaining column does not include any said wild or scatter symbols.

6. The gaming machine of claim 1 wherein criteria for awarding of a prize in said feature game are identical to criteria for awarding of a prize in said main game.

7. The gaming machine of claim 1 wherein criteria for awarding of a prize in said feature game are different to criteria for awarding of a prize in said main game.

8. The gaming machine of claim 1 wherein said at least one column is a left-most column of said matrix of elements.

9. The gaming machine of claim 1 wherein said uniform imagery is a depiction of field of snow.

10. The gaming machine of claim 1 wherein said elements are N-sided elements; where N is a variable and values of N include N=3.

11. The gaming machine of claim 10 wherein said values of N include 4, 5, 6, 7, 8, 9, 10, 11, 12, 13, 14, 15, 16, 17, 18, 19 and 20.

12. The gaming machine of claim 10 wherein said N-sided elements are regular hexagons.

13. A method for shortening odds of a winning outcome of a feature game of chance played on a gaming machine; said gaming machine provided with a display unit in which portions of a number of simulated rotatable reels of symbol containing elements are displayed as a matrix of symbol containing elements; said method including at the conclusion of a main game the steps of:

(a) reconfiguring at least one of said simulated rotatable reels to comprise a subset of symbols of said symbol containing elements, (b) reconfiguring said symbol containing elements of remaining ones of said simulated rotatable reels to display uniform imagery, (c) spinning and returning to a rest position said simulated rotatable reels, (d) randomly populating all said elements displaying said uniform imagery with symbols displayed in said column of said matrix corresponding to said at least one said simulated rotatable reel.

14. The method of claim 13 wherein said selection of said symbol containing elements includes all said symbol containing elements of said remaining ones of said rotatable reels.

15. The method of claim 13 wherein said selection of said symbol containing elements excludes at least one element of one element of at least one said remaining ones of said simulated rotatable reels.

16. The method of claim 15 wherein said at least one element is caused to display a "scatter" symbol.

17. The method of claim 15 wherein said at least one element is caused to display a "wild" symbol.

18. The method of claim 13 wherein "scatter" or "wild" symbols displayed in columns corresponding to said remaining ones of said simulated rotatable reels in a preceding main game are retained in position in said matrix for a first stage of said feature game.

19. The method of claim 13 wherein said selected symbols displayed in said column of said matrix corresponding to said at least one said simulated rotatable reel includes all of said symbols displayed in said column.

20. The method of claim 13 wherein said selected symbols displayed in said column of said matrix corresponding to said at least one said simulated rotatable reel excludes a "scatter" symbol.

21. The method of claim 13 wherein said selected symbols displayed in said column of said matrix corresponding to said at least one said simulated rotatable reel excludes a "wild" symbol.

* * * * *